United States Patent
Claussen et al.

(10) Patent No.: US 7,464,111 B2
(45) Date of Patent: Dec. 9, 2008

(54) APPLYING A TEMPLATED BUSINESS GRAPH TO A BUSINESS OBJECT

(75) Inventors: Christopher Shane Claussen, Austin, TX (US); Zeenat Kulkarni, San Mateo, CA (US); Yang Zhong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 450 days.

(21) Appl. No.: 11/134,497

(22) Filed: May 20, 2005

(65) Prior Publication Data

US 2006/0265715 A1    Nov. 23, 2006

(51) Int. Cl.
G06F 17/30    (2006.01)
G06F 7/00    (2006.01)
(52) U.S. Cl. .................................. 707/104.1; 707/101
(58) Field of Classification Search .................. 707/3
See application file for complete search history.

(56) References Cited

U.S. PATENT DOCUMENTS

| | | | |
|---|---|---|---|
| 5,715,460 A | 2/1998 | Acker et al. ................. 395/705 |
| 5,799,298 A | 8/1998 | Bingham et al. ................. 707/1 |
| 6,141,792 A | 10/2000 | Acker et al. ..................... 717/5 |
| 6,529,217 B1 * | 3/2003 | Maguire et al. ............. 715/769 |
| 7,013,290 B2 * | 3/2006 | Ananian ....................... 705/27 |
| 7,287,089 B1 * | 10/2007 | Lamoureux et al. ......... 709/238 |
| 2005/0235256 A1 * | 10/2005 | Freydl ......................... 717/107 |

OTHER PUBLICATIONS

Greenfield et al., "Software Factories Assembling Applications with Patterns, Models Frameworks and Tools", ACM 1-58113-751-6/03/0010, 2003, pp. 16-27.
Wieringa, "A Survey of Structured and Object-Oriented Software Specification Methods and Techniques", ACM Computing Surveys, vol. 30, No. 4, Dec. 1998, pp. 459-527.

* cited by examiner

Primary Examiner—Van H. Ngo
(74) Attorney, Agent, or Firm—Duke W. Yee; Prentiss W. Johnson; Peter B. Manzo

(57) ABSTRACT

A method is provided for using a templated pattern to define part types on a web service definition language (WSDL) interface. Applying the templated pattern enables peer services to define a transparent contract between specific WSDL part types. The templated pattern is used to wrap the original business object with the enriched business graph schema. The templated business graph is created by extending the business graph complex type that is provided by the business object framework runtime and adding an element delegating to the original business object.

6 Claims, 8 Drawing Sheets

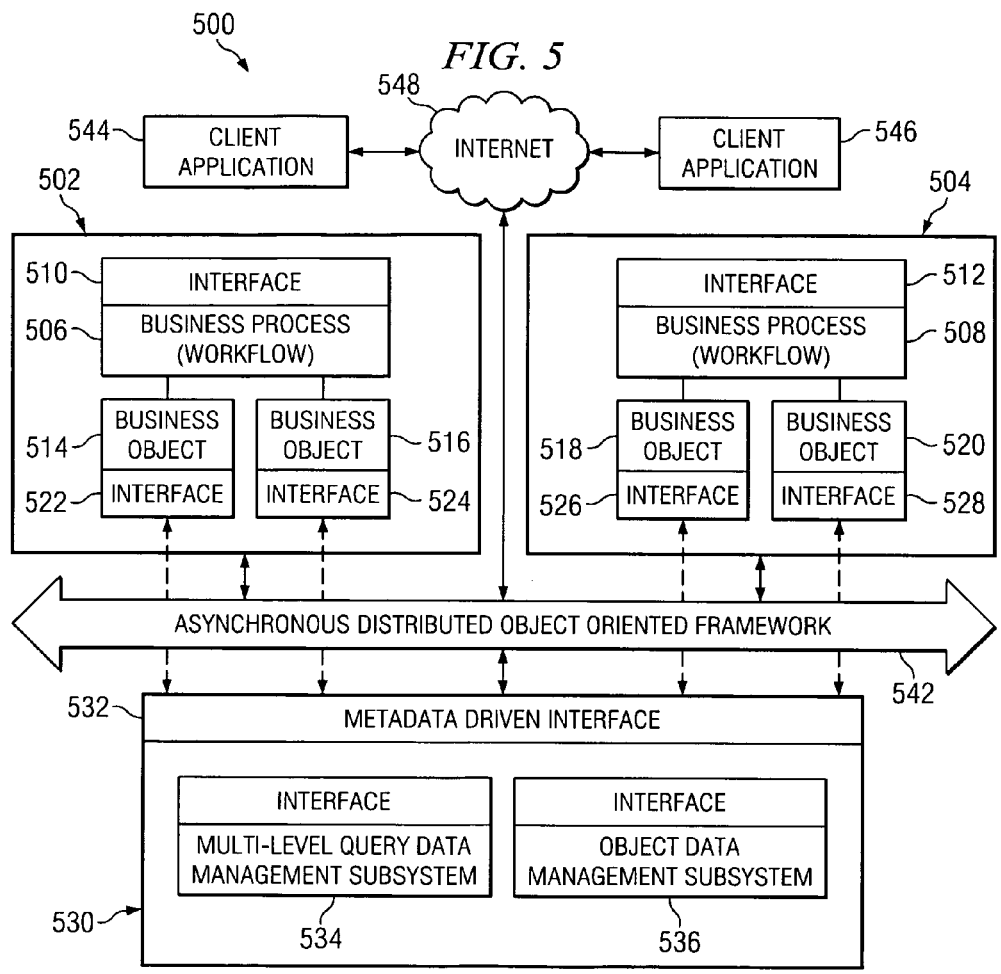
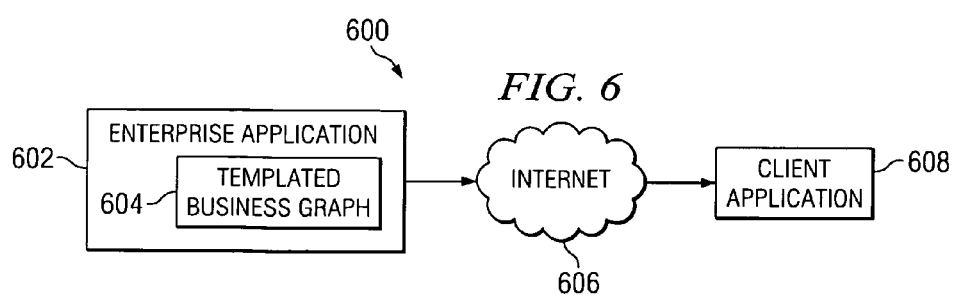

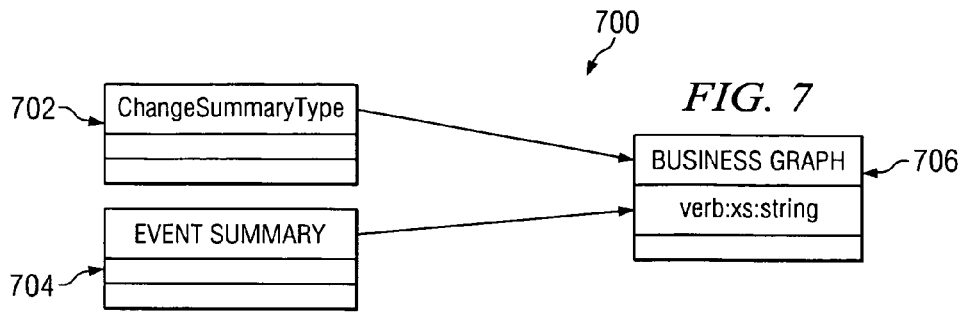
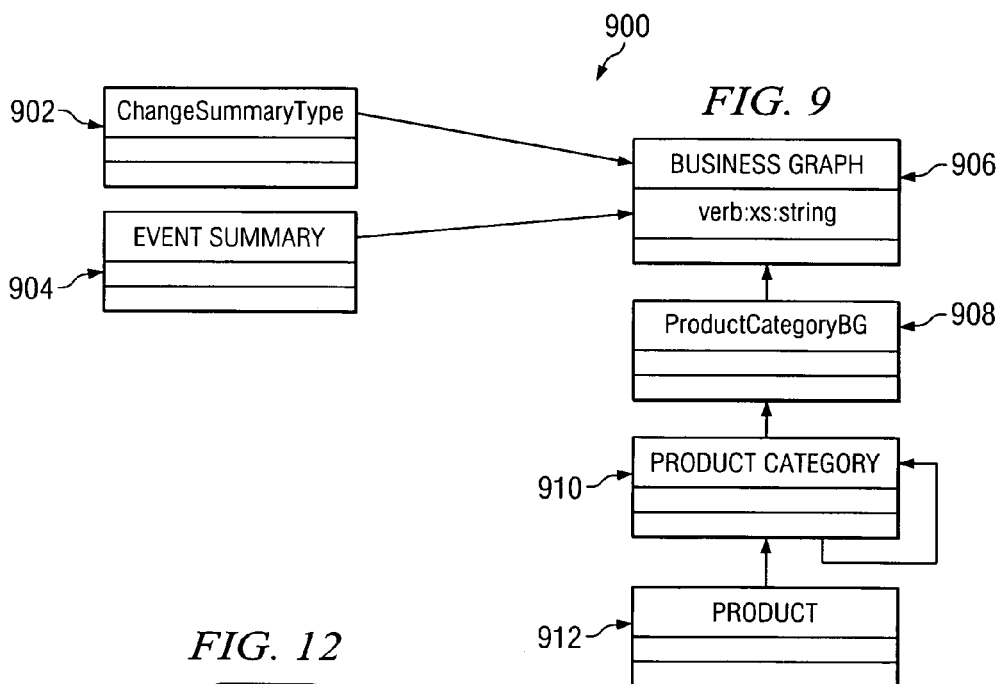

```
1   <schema
2       targetNamespace="http://www.ibm.com/xmlns/prod/websphere/bo/6.0.0"
3       xmlns:bo="http://www.ibm.com/xmlns/prod/websphere/bo/6.0.0"
4       xmlns:sdo="commonj.sdo"
5       xmlns:xs="http://www.w3.org/2001/XMLSchema"
6       xmlns="http://www.w3.org/2001/XMLSchema"
7       elementFormDefault="qualified">
8
9       <import namespace="commonj.sdo" schemaLocation="DataGraph.xsd"/>
10
11  806 { <complexType name="BusinessGraph" abstract="true">
12          <sequence>
13  802 {     <element name="changeSummary" type="sdo:ChangeSummaryType"
14                  minOccurs="0" maxOccurs="1"/>
15  804 {     <element name="eventSummary" type="bo:EventSummary"
16                  minOccurs="0" maxOccurs="unbounded"/>
17             <element name="property" type="bo:ValuesType"
18                  minOccurs="0"/>
19          </sequence>
20          <anyAttribute namespace="##other" processContents="lax"/>
21      </complexType>
22
23      <complexType name="EventSummary">
24          <sequence>
25              <any namespace="##any" processContents="lax"
26                  minOccurs="0" maxOccurs="unbounded"/>
27          </sequence>
28      </complexType>
29      <complexType name="ValuesType">
30          <complexContent>
31              <extension base="ecore:EClass"/>
32          </complexContent>
33      </complexType>
34      <attribute name="name" type="string"/>
35
36  </schema>
```

FIG. 10

```
37   <schema
38       targetNamespace="http://www.scm.com/ProductCategoryTypes/ProductCategoryBG"
39       xmlns:pcbg="http://www.scm.com/ProductCategoryTypes/ProductCategoryBG"
40       xmlns:pc="http://www.scm.com/ProductCategoryTypes"
41       xmlns:bo="http://www.ibm.com/xmlns/prod/websphere/bo/6.0.0"
42       xmlns:xs="http://www.w3.org/2001/XMLSchema"
43       xmlns="http://www.w3.org/2001/XMLSchema"
44       elementFormDefault="qualified">
45
46   1006 { <import namespace="http://www.ibm.com/xmlns/prod/websphere/bo/6.0.0"
47                   schemaLocation="BusinessGraph.xsd"/>
48
49       <import namespace="http://www.scm.com/ProductCategoryTypes"
50           schemaLocation="ProductCategoryTypes.xsd"/>
51
52       <complexType name="ProductCategoryBG">
53           <complexContent>
54   1008      <extension base="bo:BusinessGraph">
55               <sequence>
56                   <element name="verb" minOccurs="0" maxOccurs="1"/>
57                   <element name="productCategory"
58   1010              type="pc:ProductCategory"
59                       minOccurs="0" maxOccurs="1"/>
60               </sequence>
61           </extension>
62           </complexContent>
63       </complexType>
64
65   </schema>
```

```
66   <definitions xmlns="http://schemas.xmlsoap.org/wsdl/"
67            xmlns:tns="http://com.ibm.wbiserver.mmr/supplier"
68            name="supplier"
69            xmlns:xsd="http://www.w3.org/2001/XMLSchema"
70            xmlns:ref="http://com.ibm.wbiserver.mmr/in_sup"
71            targetNamespace="http://com.ibm.wbiserver.mmr/supplier">
72
73        <types>
74        <schema
75   xmlns="http://www.w3.org/2001/XMLSchema"
76   xmlns:PC="http://com.ibm.wbiserver.mmr.bo/ProdCategory/ProdCategoryBG"
77   targetNamespace="http://com.ibm.wbiserver.mmr/in_sup">
78
79              <import namespace="http://com.ibm.wbiserver.mmr.bo/ProdCategory/
         ProdCategoryBG" schemaLocation="bo/ProdCategoryBG.xsd"/>
80
81              <element name="PC" type="PC:ProductCategoryBG"/>      ⟵1102
82        </schema>
83        </types>
84
85        <message name="PC_Request">
86              <part element="ref:PC" name="PCIn"/> ⟵1102
87        </message>
88
89        <message name="PC_Response">
90              <part element="ref:PC" name="PCOut"/> ⟵1102
91        </message>
```

TO FIG. 11B

FROM FIG. 11A

```
92
93          <message name="Input">
94              <part name="In" type="xsd:string"/>
95          </message>
96
97          <message name="Output">
98              <part name="Out" type="xsd:string"/>
99          </message>
100
101         <portType name="src_port">
102             <operation name="TwoWay">
103                 <input message="tns:PC_Request"
104                     name="PC_Request_TwoWay" />
105                 <output message="tns:PC_Response"
106                     name="PC_Response_TwoWay" />
107
108             </operation>
109             <operation name="OneWay">
110                 <input message="tns:PC_Request"
111                     name="PC_Request_OneWay" />
112             </operation>
113
114             <operation name="invoke">
115                 <input message="tns:Input" name="Invoke_Request"/>
116                 <output message="tns:Output" name="Invoke_Response"/>
117             </operation>
118
119         </portType>
120     </definitions>
```

FIG. 11B    1100

APPLYING A TEMPLATED BUSINESS GRAPH TO A BUSINESS OBJECT

BACKGROUND OF THE INVENTION

1. Field of the Invention

The present invention relates generally to templated patterns. Still more particularly, the present invention provides a method to apply a templated pattern to an object graph.

2. Description of the Related Art

The Service Data Objects (SDO) framework provides a unified framework for data application development. With SDO, you do not need to be familiar with a technology-specific application protocol interface (API) in order to access and utilize data. A user needs to know only one API, the SDO API, which lets the user work with data from multiple data sources, including relational databases, entity Enterprise JavaBeans (EJB) components, Extensible Markup Language (XML) pages, Web services, the Java™ Connector Architecture, JavaServer™ Pages pages, and more.

Although the word "framework" is used, framework is analogous to the Eclipse framework. Eclipse is designed so that tools can be integrated together thanks to its solid and extensible base. SDO is similar in the sense that it provides a framework to which applications can be contributed and these applications will all be consistent with the SDO model.

Unlike some of the other data integration models, SDO does not stop at data abstraction. The SDO framework also incorporates a good number of Java™ 2 Platform Enterprise Edition (J2EE™) patterns and best practices, making it easy to incorporate proven architecture and designs into user applications. For example, the majority of Web applications today are not (and cannot) be connected to backend systems 100 percent of the time; so SDO supports a disconnected programming model. Likewise, today's applications tend to be remarkably complex, comprising many layers of concern.

XML is becoming ubiquitous in distributed applications. For example, XML Schema (XSD) is used to define business rules in an application's data format. Also, XML itself is used to facilitate interaction: Web services use XML-based Simple Object Access Protocol (SOAP) as the messaging technology. XML is a very important driver of SDO and is supported and integrated in the framework.

Data objects are the fundamental components of SDO. Data objects are the SDO representation of structured data. Data objects are generic and provide a common view of structured data built by a data mediators services (DMS). Data objects hold their "data" in properties. Data objects are linked together and contained in data graphs.

Data graphs provide a container for a tree of data objects. They are produced by the DMS for SDO clients to work with. A data graph contains a root data object, all of the root's associated data objects, and a change summary (more on change summaries in a moment). When being transmitted between application components (for example, between a Web service requester and provider during service invocation) the web service definition language (WSDL) is typed with DataGraphs which could be either Customer or Order or any object. This makes the contract between the sender and receiver implicit and unclear.

The purpose of a business is to deliver products to a market in order to make a profit. In general, a business has a number of processes, each of which can be characterized as a pattern of business events. A business also has a domain that can be characterized as a collection of business objects. Business objects are the "things" around which each business process is organized. Examples of business objects are products, customers, units in which the customers consume the products and in which the business produces them (seen in customer orders), resources that are contributed during the production process (materials, employees, machines), units in which these resources are acquired (seen in purchase orders), and suppliers of these resources.

Thus, it would be advantageous to provide a method to apply a templated pattern to an object graph that allows the WSDL part types to be typed with the templated Business Graph which defines an explicit contract between the peer services.

SUMMARY OF THE INVENTION

The present invention provides a method for using a templated pattern to define part types on a web service definition language (WSDL) interface. Applying the templated pattern enables peer services to define a transparent contract between specific WSDL part types. The templated pattern is used to wrap the original business object with the enriched business graph schema. The templated business graph is created by extending the business graph complex type that is provided by a business object framework runtime and adding an element delegating to the original business object.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a functional block diagram of a services oriented architecture in accordance with an illustrative embodiment of the present invention;

FIG. 6 is an illustration of a templated business graph being sent between peer web services in accordance with an illustrative embodiment of the present invention;

FIG. 7 is a model of a business graph in accordance with an illustrative embodiment of the present invention;

FIG. 8 is an exemplary XML schema model for the abstract business graph in accordance with an illustrative embodiment of the present invention;

FIG. 9 is a model of a business graph after applying a templated business graph pattern in accordance with an illustrative embodiment of the present invention;

FIG. 10 is an exemplary generated XML schema model for the templated business graph model in accordance with an illustrative embodiment of the present invention;

FIG. 11 is an exemplary XML schema model transferred between two services in accordance with an illustrative embodiment of the present invention; and FIG. 12 depicts a flow diagram illustrating an exemplary operation of applying a templated business graph in accordance with an illustrative embodiment of the present invention.

DETAILED DESCRIPTION OF THE PREFERRED EMBODIMENT

Figure 1:
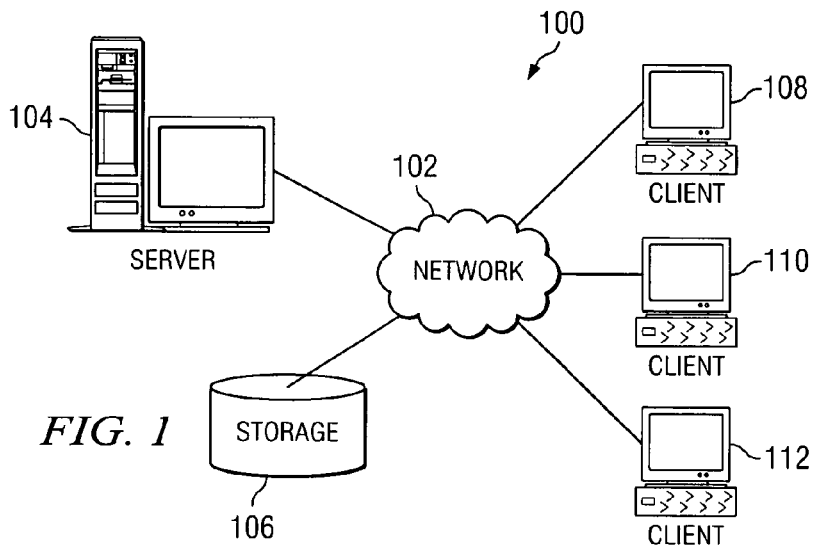
FIG. 1 is a pictorial representation of a network of data processing systems in which the present invention may be implemented.
Figure 2:
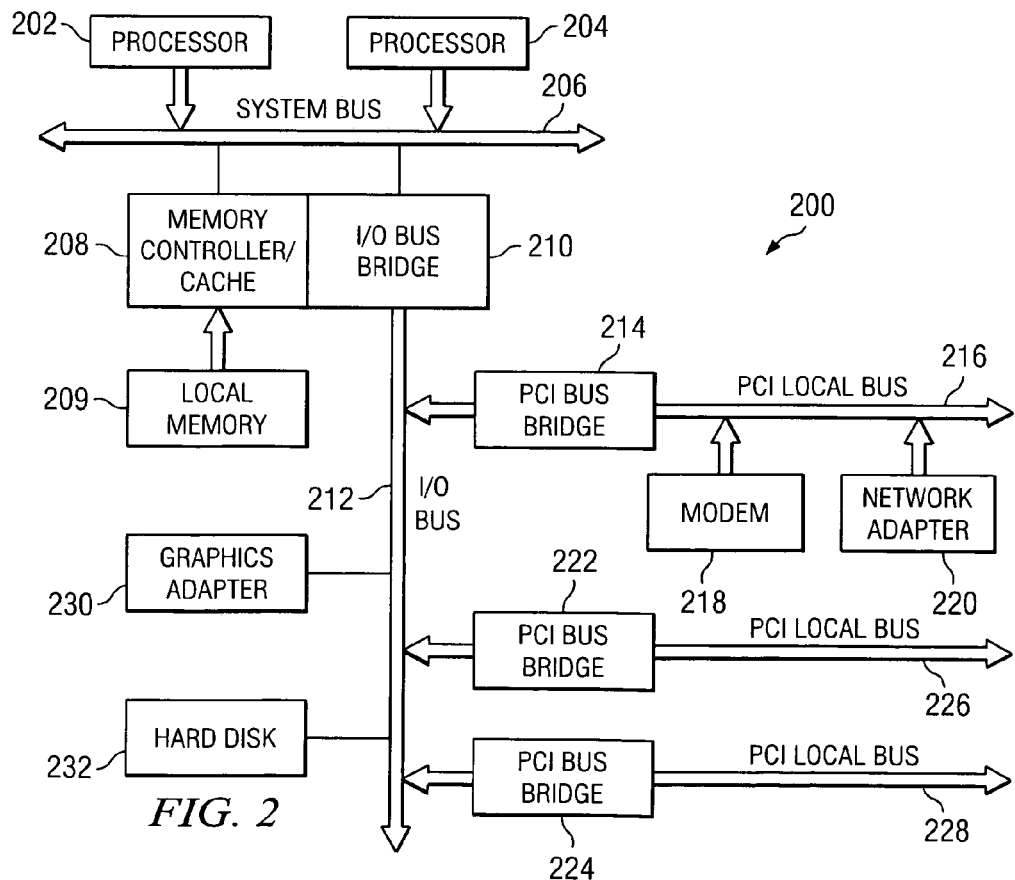
FIG. 2 is a block diagram of a data processing system that may be implemented as a server in accordance with an illustrative embodiment of the present invention.
Figure 3:
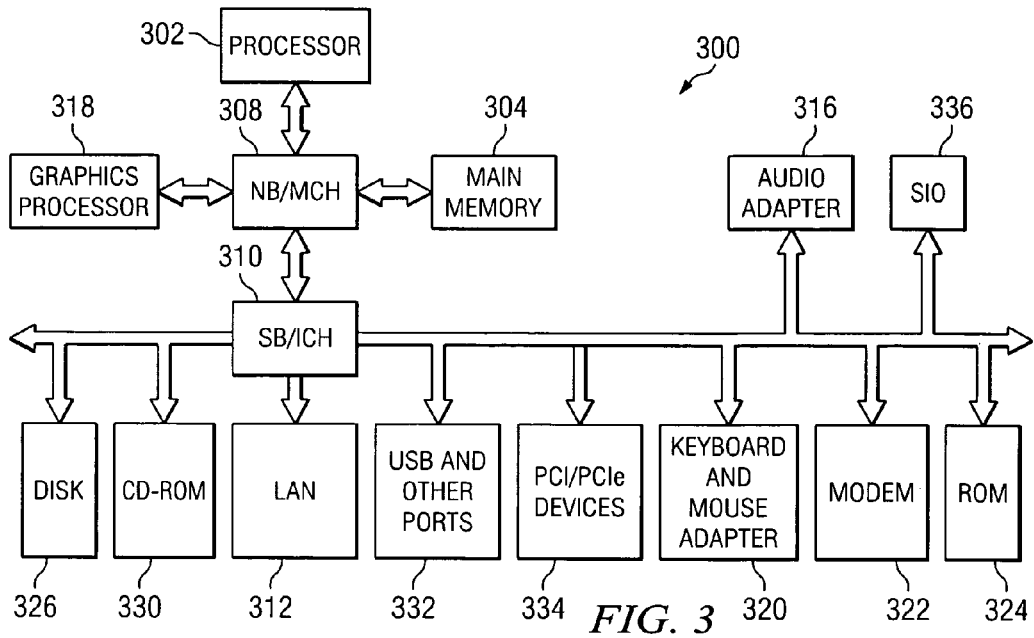
FIG. 3 is a block diagram of a data processing system in which the present invention may be implemented.

The present invention provides a method, apparatus and computer usable code for using a templated pattern to define part types on a web service definition language (WSDL) interface. The data processing device may be a stand-alone computing device or may be a distributed data processing system in which multiple computing devices are utilized to perform various aspects of the present invention. Therefore, the following FIGS. 1-3 are provided as exemplary diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In accordance with a embodiment of the present invention, server 104 provides application integration tools to application developers for applications that are used on clients 108, 110, 112. More particularly, server 104 may provide access to application integration tools that will allow two different front-end applications in two different formats to disseminate messages sent from each other.

In accordance with one embodiment, a dynamic framework is provided for using a graphical user interface (GUI) for configuring business system management software. This framework involves the development of user interface (UI) components for business elements in the configuration of the business system management software, which may exist on storage 106. This framework may be provided through an editor mechanism on server 104 in the depicted example. The UI components and business elements may be accessed, for example, using a browser client application on one of clients 108, 110, 112.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with an illustrative embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java™ programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

The present invention uses a templated pattern to define part types on a web service definition language (WSDL) interface. Applying the templated pattern enables peer services to define a transparent contract between specific WSDL part types. The templated pattern is used to wrap the original business object with the enriched business graph schema. A business object is a physical or logical object of significance to a business; for example, a sales order, department, assembly, item, balance, or invoice. A business object is analogous to a class in object-oriented terminology. As an aspect of the present invention, a set of business objects may be one or more business objects. The templated business graph is created by extending the business graph complex type that is provided by the WebSphere® Business Integration Server (WBI) Diamond Business Object Framework runtime and adding an element delegating to the original business object. That is, the templated business graph wraps the business object, such that the templated business graph is actually combined with the business object to determine how that business object is defined.

Figure 4:
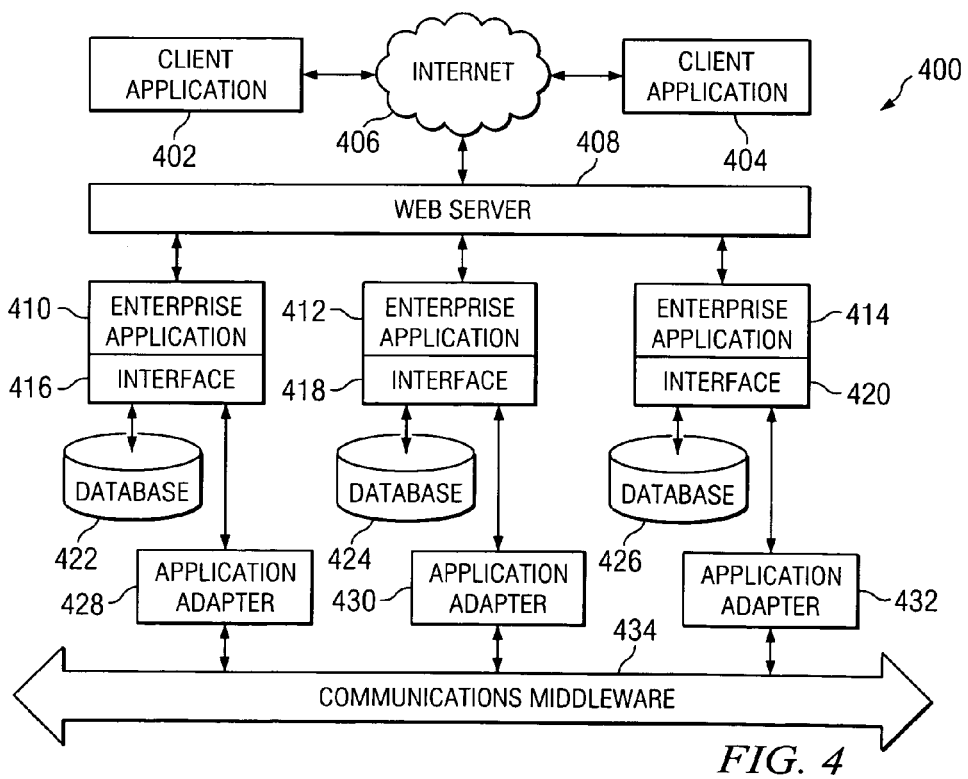
FIG. 4 is a functional block diagram of an enterprise application architecture in accordance with an illustrative embodiment of the present invention.

Turning to FIG. 4, a functional block diagram of the architecture of an enterprise application is depicted in accordance with an illustrative embodiment of the present invention. In the traditional enterprise architecture 400, client applications 402 and 404 access enterprise applications 410, 412, and 414 through Internet network 406 and Web server 408. Internet network 406 and Web server 408 are similar to network 102 and server 104 of FIG. 1. Client application 402 and client application 404 may be an application running on client 108, 110, and 112 of FIG. 1. Each enterprise application 410, 412, and 414 contains an interface 416, 418, and 420 to access database 422, 424, and 426. Databases 422, 424, and 426 are similar to storage 106 of FIG. 1 and may any type of data structure. Enterprise applications 410, 412, and 414 portfolio interoperability is facilitated by application adapters 428, 430, and 432 through interfaces 416, 418, and 420, which expose the information models and services into a distributed object framework or onto specialized communication middleware buses 434. Domain application adapters may also be used to perform data mapping to and from enterprise applications 410, 412, and 414. This functionality of the domain adapters limits their reusability because they are closely tied to object specifications in some master application acting as the entry point to the enterprise application services. Enterprise object models are organization specific. Whenever new services are needed new data mapping may require retrofitting the entire architecture with the new capability.

Turning now to FIG. 5, a functional block diagram of a services oriented architecture is depicted in accordance with an illustrative embodiment of the present invention. Services oriented architecture 500 is a software platform that caters to the deployment of runtime component services 502 and 504. Software component services 502 and 504 are two-layer abstractions in which the upper layer specifies business processes 506 and 508 as mini automated workflows. Access to the business processes 506 and 508 is through interfaces 510 and 512 which may be any type of interface such as an extensible markup language (XML) or Internet inter-ORB protocol (IIOP) interface. The lower layer consists of business objects 514, 516, 518, and 520 that implement the information and data models on which the business processes operate. Business objects use a metadata driven (MDD) interface 522, 524, 526, and 528 to interact with the enterprise repository 530, using enterprise repository 530 as their persistent storage.

Enterprise repository 530 is comprised of a metadata driven interface 532, a multi-level query data management subsystem 534 and an object data management subsystem 536. Both multi-level query data management subsystem 534 and object data management subsystem 536 have an interface 538 and 540 to interact with metadata driven interface 532 of enterprise repository 530. Interfaces 512, 532, 538, and 540 may be any type of interface such as an extensible markup language (XML), Internet inter-ORB protocol (IIOP), or interface definition language (IDL) interface.

Asynchronous distributed object oriented framework 542 provides the framework for client applications 544 and 546 through Internet 548 to access enterprise repository 530 and software runtime component services 502 and 504. In this approach, new services are created as new run-time deployable components. The services are built from the collaboration of business objects 514, 516, 518, and 520 that are themselves runtime deployable components 502 and 504. In a normal component, the information model is mapped directly to the enterprise repository 530. It is this tight coupling between the business objects 514, 516, 518, and 520 and its enterprise repository 530 that induces inflexibility into a typical enterprise. The metadata aware business objects approach removes the rigid constraints between business objects 514, 516, 518, and 520 and enterprise repository 530. With the metadata interface, enterprise repository 530 needs of business objects 514, 516, 518, and 520 can be dynamically created on the fly. In addition, new relationships and associations between component model specifications can also be dynamically created. This approach paves the way for a new breed of enterprise software, one in which arbitrary interaction and interoperation may be made between components to define the services offered by the enterprise.

FIG. 6 is an illustration of a templated business graph being sent between peer web services in accordance with an illustrative embodiment of the present invention. As objects are requested by or sent to client application 608, enterprise application 602 sends the templated business graph 604 over a network, such as Internet 606, to client application 608. The peer web services, client application 608 and enterprise application 602 communicate via a WSDL and the WSDL establishes an explicit contract between the services. That is, the explicit contract defines the data that is being exchanged between two services, such as a supplier and a receiver. This WSDL contains templated business graph 604, ensuring that only templated business graph 604 is sent between the two services.

FIG. 7 is a model of a business graph in accordance with an illustrative embodiment of the present invention. To understand the templated business graph pattern in more detail, it is first important to take a quick look at the business graph complex type provided by the business object framework. Business graph 700 is an exemplary UML model for a business graph. Business graph 700 is abstract and provides just a standard set of header objects 702 and 704 that are added to the top level of business object 706. Business graph 700 is created by a business object runtime that is packaged as part of the product deployed as a peer web service. Header objects, such as header objects 702 and 704 in business graph 700, provide value added services to the user. The templated business graph is an extension of a generic business graph, such as business graph 700, and is described later.

FIG. 8 is an exemplary XML schema model for the abstract business graph of FIG. 7 in accordance with an illustrative embodiment of the present invention. In XML schema model 800, headers 702 and 704 of FIG. 7 are shown in a converted XML format as header objects 802 and 804. Header objects 802 and 804 are shown as part of business graph 806, which is the XML format of business graph object 706 in FIG. 7. This model is created by the business object runtime and is packaged as part of the system.

The business graph is a wrapper on an original business object, such as Customer or Order, and is provided in order to remain non-intrusive to an externally developed model of a business object. A pattern named the Templated Business Graph is used to wrap the original business object with the enriched business graph schema. The templated business graph is created by extending the business graph complex type that is provided by a business object framework runtime and adding an element delegating to the original business object.

FIG. 9 depicts a model of a business graph after applying a templated business graph pattern in accordance with an illustrative embodiment of the present invention. Model 900 illustrates a hierarchical business object named product category 910 that contains one or more business objects, such as product 912. A templated business graph pattern 908 is applied to business graph object 906. Business graph object 906 is the same as business graph object 706 of FIG. 7 which is comprised of header objects 902 and 904 which are the same as header objects 702 and 704 of FIG. 7.

A user would start with a hierarchical business object, like product category 910, which describes the data that needs to be transmitted. This business object 910 is either created by the user using a business object designer tool, such as the Eclipse based business object designer tool, or obtained from a third party vendor. The business object 910 is loaded into the tool, which further enhances it with value added services by wrapping it with a templated business graph 908, in this case a product category business graph 908. Product category business graph 908 is extended from a generic business graph as described above. The product category business graph 908 is then saved by the tool as an XML schema.

FIG. 10 is an exemplary generated XML schema model for the templated business graph model of FIG. 9 in accordance with an illustrative embodiment of the present invention. In order to remain non-intrusive to externally modeled business objects, such as product category 910 and product 912 of FIG. 9, it is expected that business object tools will create the product category business graph 1008 delegating to the existing product category business object 1010. Generated business graph 1000 demonstrates an exemplary business graph 1006 for the Product Category 1010.

In applying a templated business graph pattern to an object graph, the templated business graph pattern provides an exact definition of the part types on a web service definition language (WSDL) interface. The application of the templated business graph pattern enables peer services to define a transparent contract. That is, to define the data that is being exchanged between two services, such as a supplier and a receiver. An example of a templated business graph is the product category business graph 1010 of FIG. 10. As the WSDL contract specifies the product category business graph, then a clear definition is provided for that data being transferred between two services, such as product category 910 type of FIG. 9. The advantage of presently described templated business graph over existing IBM's Service Data Object (SDO) or Microsoft's ADO.net is that it specifies in the WSDL contract the precise data that is being exchanged as oppose to a generic object, making the contract explicit.

FIG. 11 depicts an exemplary XML schema model transferred between two services in accordance with an illustrative embodiment of the present invention. In model 1100, an exemplary supplier service publishes the WSDL that explicitly indicates that product category business graph 1102 is the published object between the two services using the templated business graph pattern.

FIG. 12 depicts a flow diagram 1200 illustrating an exemplary operation of applying a templated business graph in accordance with an illustrative embodiment of the present invention. As the operation beings a user would select a hierarchical business object, which is loaded into the tool (step 1202). The hierarchical business object may be either created by the user using a business object designer tool, such as the Eclipse based business object designer tool, or obtained from a third party vendor. The user is then presented with a list of templated business graphs (step 1204). The user selects the templated business graph that most suitably defines the hierarchical business object. This selection is received by the tool (step 1206). The hierarchical business object is then wrapped by the templated business graph (step 1208) and creates a new business graph. The new business graph is the saved as an XML schema (step 1210) with the operation ending thereafter.

Thus, the present invention uses a templated pattern to define part types on a web service definition language (WSDL) interface. Applying the templated pattern enables peer services to define a transparent contract between specific WSDL part types. The templated pattern is used to wrap the original business object with the enriched business graph schema. The templated business graph is created by extending the business graph complex type that is provided by the WebSphere® Business Integration Server (WBI) Diamond Business Object Framework runtime and adding an element delegating to the original business object.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for applying a templated business graph to a business object, the method comprising:

loading a selected set of hierarchical business objects based on user input, wherein the set of hierarchical business objects is created by a user using a hierarchical business object design tool;

presenting a plurality of templated business graphs that are unified modeling language models for a business graph to the user;

receiving a selection of a templated business graph that most suitably defines the set of hierarchical business objects from the plurality of templated business graphs;

wrapping the set of hierarchical business objects with the templated business graph such that the set of hierarchical business objects is combined with the templated business graph to define and enhance the set of hierarchical business objects with value added services to the user to form a templated business object, wherein a set of header objects in the templated business graph provide the value added services, and wherein the set of header objects is added to a top level of the set of hierarchical business objects; and saving the templated business object as an Extensible Markup Language schema.

2. The method of claim 1, wherein the plurality of templated business graphs is stored in a data structure.

3. The method of claim 2, wherein the data structure is accessed over a set of peer web services.

4. The method of claim 3, wherein the peer web services operate using a web service definition language.

5. The method of claim 4, wherein the web service definition language establishes an explicit contract between the peer web services.

6. The method of claim 1, wherein the set of business objects is retrieved from storage.

* * * * *